United States Patent [19]

Wheeler et al.

[11] Patent Number: 5,126,778
[45] Date of Patent: Jun. 30, 1992

[54] DEDICATED PHOTOGRAPHIC FLASH SYSTEM FOR VARYING FLASH SPREAD BASED UPON CAMERA-TO-SUBJECT DISTANCE

[75] Inventors: Richard B. Wheeler, Webster; David R. Dowe, Holley; Mikhail Vaynshteyn, Rochester, all of N.Y.

[73] Assignee: Eastman Kodak Company, Rochester, N.Y.

[21] Appl. No.: 730,416

[22] Filed: Jul. 16, 1991

[51] Int. Cl.⁵ ................. G03B 7/091; G03B 15/03
[52] U.S. Cl. ........................... 354/414; 354/419; 354/149.1
[58] Field of Search .......... 354/149.1, 126, 403, 354/414, 419

[56] References Cited

U.S. PATENT DOCUMENTS

| | | | |
|---|---|---|---|
| 3,783,261 | 3/1974 | Hartmann | 240/149.1 |
| 3,798,668 | 1/1974 | Hartman | 354/149.1 |
| 3,882,514 | 5/1975 | Graham | 354/149 |
| 4,122,466 | 10/1978 | Iwata | 354/413 |
| 4,171,887 | 10/1979 | Hayata | 354/126 |
| 4,176,930 | 12/1979 | Imura | 354/149.1 |
| 4,325,621 | 4/1982 | Iwata et al. | 354/149.11 |
| 4,423,940 | 1/1984 | Kashihara et al. | 354/149 |
| 4,462,666 | 7/1984 | Orban | 354/126 |
| 4,512,644 | 4/1985 | Yoshida | 354/149.1 |
| 4,515,453 | 5/1985 | Wakabayashi et al. | 354/149.1 |
| 4,609,269 | 9/1986 | Kamata | 354/149.11 |
| 4,666,280 | 5/1987 | Miyawaki et al. | 354/149.1 |
| 4,821,053 | 4/1989 | Dowe et al. | 354/149.1 |
| 4,847,647 | 7/1989 | Ueda | 354/149.1 |
| 4,851,868 | 7/1989 | Taniguchi et al. | 354/149.1 |
| 4,914,461 | 4/1990 | Hori | 354/149.1 |
| 4,935,759 | 6/1990 | Tsuji et al. | 354/149.1 |
| 4,982,210 | 1/1991 | Shimada et al. | 354/149.1 |

Primary Examiner—L. T. Hix
Assistant Examiner—J. K. Han
Attorney, Agent, or Firm—Peter L. Michaelson

[57] ABSTRACT

A dedicated electronic flash unit for automatically varying flash spread based on camera-to-subject distance. Specifically, in one embodiment, a light source includes a flash tube mounted adjacent a reflector. An actuator comprises an electric stepper motor for controlling the movement of a pair of opposed diffusion plates. The actuator includes a pair of armatures that are energized, in response, to the output of the camera's rangefinding system. When a photograph is to be taken, the diffusion plates are pivoted by the actuator to one of three different positions. In one position, the neutral position, the diffusion plates are positioned on opposite sides of the reflector. In a second position, the actuator pivots the diffusion plates such that one of the plates covers the light output of the reflector to create wide-angle illumination of the subject. In a third position, the actuator pivots the other diffusion plate into position to cover the reflector output in order to further increase the angle-of-illumination. Other embodiments utilize a sectioned cylindrical lens-diffuser which is rotated into a proper position or a single diffuser that is moved towards or away from the flash tube to vary the flash angle-of-illumination with changes in camera-to-subject distance.

21 Claims, 4 Drawing Sheets

DEDICATED PHOTOGRAPHIC FLASH SYSTEM FOR VARYING FLASH SPREAD BASED UPON CAMERA-TO-SUBJECT DISTANCE

BACKGROUND OF THE INVENTION

1. Field of the Invention

The present invention relates to cameras with electronic flash capability and, in particular, to a system for improving the quality of direct flash illumination, by automatically coupling flash spread to subject distance.

2. Description of the Prior Art

In the field of photography, there are numerous types of cameras available that have dedicated flash systems. Many of these cameras include a built-in flash unit that is an integral part of the camera. The field of illumination of such flash units is often designed to be less than the angle-of-view of the objective lens of the camera in order to maximize the flash range, that is, to obtain maximum subject distance for an acceptable flash exposure. However, when the angle-of-illumination is less than the angle-of-view of the objective lens, the center of the image field receives a disproportionately high percentage of the total illumination. As a result, the flash illumination, especially at short camera-to-subject distances, is harsh and displeasing, and the resulting lighting contrast between the principal subject and the surrounding objects is often quite high. This often causes printer-classification failures. These failures, brought about by non-uniform illumination and over-exposure of the principal subject, induce a printer algorithm used in an photographic printer at a photofinisher to calculate improper printing conditions. As a result, the yield of acceptable prints is reduced and the photofinisher is compelled to reprint many negatives thereby adding time and cost to a photofinishing process.

In some cameras, the effects of such illumination problems are mitigated by providing means for selectively varying the flash illumination. For example, bounce flash, that is, directing or aiming the flash tube at a ceiling, white card or other light scattering source, is one solution that can provide a more uniform, diffuse illumination at short camera-to-subject distances that direct flash illumination can. However, power and size constraints have prevented its use in compact cameras. Flash units that permit bounce flash normally require increased capacitor size and, therefore, larger power sources. Also, such units usually have relatively long recycle times.

Another solution to the illumination problems encountered in compact cameras involves the use of a flash unit in which the direction of the light beam emitted from the flash can be varied relative to the optical axis of the objective lens of the camera. Redirecting the light beam from a flash unit can improve the picture quality by reducing the illumination of a close-up subject. U.S. Pat. No. 3,882,514 (issued to T. Graham on May 6, 1975 and hereinafter referred to as the '514 patent) describes a camera with a self-contained adjustable flash that varies the light beam direction from the flash as the objective lens is manually focused.

A further flash-illumination solution involves the use of a wide-angle flash reflector/diffuser. Wide-angle direct flash coverage usually provides improved scene illumination, particularly at short camera-to-subject distances, when compared to units that vary the direction of the flash beam as in the '514 patent. However, although wide-angle direct flash units have served the purpose, these units have not proved entirely satisfactory because they reduce flash range. As such, cameras have been developed with a moveable diffuser that provides wide-angle illumination only when manually engaged. Wide-angle illumination at short camera-to-subject distances is achieved, usually at short camera-to-subject distances, by manually moving the diffuser to a position in front of the flash. Narrow, more specular illumination at longer distances is achieved by retracting the diffuser away from the flash.

U.S. Pat. No. 4,176,930 (issued to T. Imura on Dec. 4, 1979) describes a camera with a self-contained flash system having a moveable diffuser for varying the illumination angle. The camera comprises two objective lenses; namely, a telephoto lens and a wide-angle lens, that may be manually selected by the operator. The wide-angle lens is selected by manually moving a bracket that moves the diffuser into the optical path of the flash for wide-angle illumination. When the telephoto lens is selected, the bracket movement retracts the diffuser away from the optical path of the flash to increase flash range and provide narrow, specular illumination.

A method for automatically varying the illumination angle in response to the selection of the focal length of the objective lens is shown in U.S. Pat. No. 4,851,868 (issued to N. Faniguchi et al on Jul. 25, 1989). Here, a flash unit is coupled to a microcomputer that receives digital data that represents the focal length of the lens. The focal length data is transmitted by the microcomputer to a control mechanism that alters the angle-of-illumination of the flash unit: such that this angle coincides with the angle-of-view of the objective lens.

As the preceding summary illustrates, none of the illustrative prior art embodiments set forth above varies flash illumination in a simple, inexpensive and automatic manner to prevent a subject, particularly at relatively short camera-to-subject distances, from becoming excessively illuminated during a flash exposure. Consequently, these embodiments which vary illumination angle will require a secondary means for regulating exposure, such as electronically quenching the flash emission or changing the size of the objective lens aperture. Use of such systems or associated mechanisms to provide this type of exposure control adds cost and complexity to the camera; as such, they are not suitable for use in inexpensive camera products.

Thus, for quite some time, a need has existed in the art for a simple, inexpensive and automatic system for varying flash illumination in a manner that effectively prevents a principal subject, particularly when located at relatively close camera-to-subject distances, from becoming over-exposed by the flash. Such a system, if it were to exist, would be well suited for use in inexpensive camera products, including fixed-focus, fixed-aperture cameras that do not include secondary exposure control systems or mechanisms.

SUMMARY OF THE INVENTION

We have advantageously developed an electronic flash system that overcomes the deficiencies known in the art.

Through our invention, we provide a camera with an electronic flash system in which the flash angle-of-illumination (i.e. flash spread or beam width) is based on subject distance, as automatically determined by a rangefinding system in the camera. To attain this, the present invention contemplates a unique electronic flash system having an actuator coupled to the camera range-finding system for automatically varying the angle-of-illumination of the flash. Our inventive camera also uses exposure information, specifically ambient light level, to determine whether flash illumination should be used at all, i.e. whether flash illumination is expected to actually improve the lighting contrast levels in the scene being photographed or not.

Specifically, the present invention is a dedicated flash system having moveable light-directing elements that may be controlled in response to electrical outputs from the rangefinding control system. The moveable light-directing elements include moveable lenses, diffusers and/or reflectors that can be automatically moved to different positions, thereby varying the illumination angle and providing a plurality of different levels of light output.

By varying the angle-of-illumination of the flash in response to subject-distance information, the present invention improves lighting uniformity, provides inexpensive exposure control and improves photofinishing yield in one simple operation. At short camera-to-subject distances, the flash angle-of-illumination extends beyond the angle-of-view of the objective lens of the camera, thereby producing uniform, diffuse lighting and eliminating over-exposure of the principal subject. As the camera-to-subject distance increases, the flash angle-of-illumination is reduced. The reduced angle-of-illumination provides extended flash range and proper exposure of the principal subject.

In accordance with specific teachings of our invention, our inventive electronic flash includes a light source having a flash tube mounted adjacent a reflector. An actuator comprises an electric stepper motor for controlling the movement of a pair of opposed diffusion plates. The actuator includes a pair of armatures that are controlled by the microprocessor control circuit of the camera. This control circuit selects the appropriate diffusion plate in response to the outputs of the rangefinding control system. Flash illumination is triggered by the microprocessor control circuit if the exposure control system in the camera determines that the ambient light level is sufficiently low such that flash illumination is expected to improve the lighting contrast level in the scene. In particular and assuming that the ambient light level is sufficiently low to support flash photography, when a photograph is to be taken, the diffusion plates are pivoted by the actuator to one of three different positions based upon subject-distance. In one position, the neutral position, the diffusion plates are positioned on opposite sides of the reflector. In a second position, the actuator pivots the diffusion plates such that one of the plates covers the light output of the reflector to create wide-angle illumination of the subject. In the third position, the actuator pivots the other diffusion plate into position to cover the reflector output to create super wide-angle illumination. In another embodiment of our invention, the light output passes through a circular cylindrical lens-diffuser that has three sections. One section of this lens-diffuser is clear for normal illumination; another section has a diffuser surface for wide-angle illumination; and a third section is a lens for long range illumination. A further embodiment of our invention utilizes a single diffuser plate that is moved towards or away from the light source to create different flash angles of illumination. An additional embodiment of our invention relies on varying the shape of the surface of a flash reflector to create different angles of illumination.

BRIEF DESCRIPTION OF THE DRAWINGS

The teachings of the present invention will be readily understood by considering the following detailed description in conjunction with the accompanying drawings, in which.

To facilitate understanding, identical reference numerals have been used, where possible, to denote identical elements that are common to various figures.

DETAILED DESCRIPTION

Figure 2:
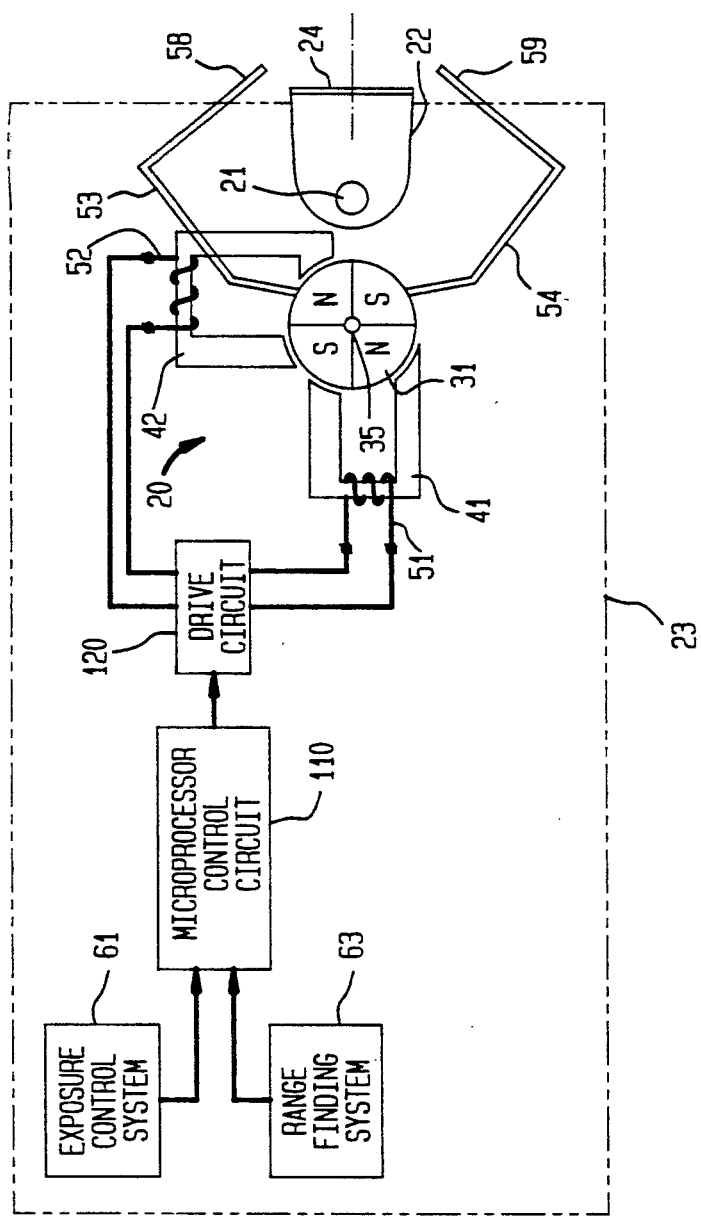
FIG. 2 is a left side elevation view of the first embodiment shown in FIG. 1.
Figure 1:
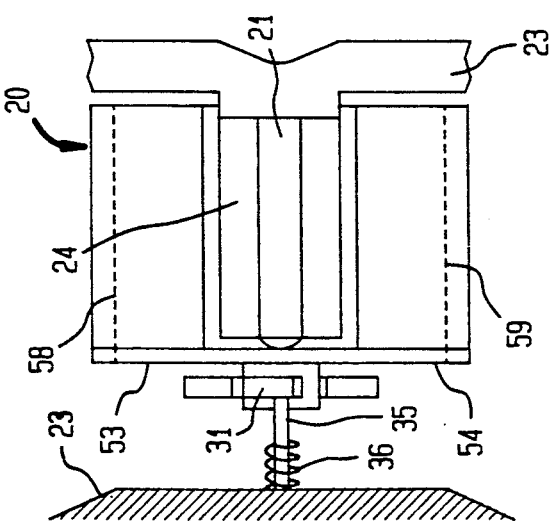
FIG. 1 is a front elevation view of a first embodiment of our invention shown in a first operating position.

Referring now to the drawings, FIGS. 1-4 show electronic flash system 20 having flash tube 21 mounted at the focus of parabolic reflector 22 that is fixed to camera body 23 (FIGS. 1-2). Reflector 22 has a front aperture covered with light-transmitting protective plate 24.

Four-pole magnet 31, in the form of a relatively thin circular plate, is fixed on shaft 35 which is rotatably mounted on camera body 23 and biased by coil spring 36 into a neutral position shown in FIG. 2. Two poles of one polarity, e.g. north, and two poles of the opposite polarity, e.g. south, are alternately and symmetrically spaced about the perimeter of circularly shaped magnet 31.

A pair of C-shaped magnetic cores (armatures) 41 and 42 (not shown in FIG. 1 to expose underlying magnet 31), fixed to camera body 23, each have two pole faces that are mounted adjacent to two neighboring poles of magnet 31. Electrical winding (coil) 51 is mounted on core 41. Winding (coil) 52 is mounted on core 42.

Bracket 53 is fixed, at one end thereof, to magnet 31 and carries, at its other end, diffusion plate 58. Second bracket 54 is fixed, at one end thereof, to magnet 31 and carries, at its other end, second diffusion plate 59. Diffusion plates 58 and 59, fabricated from glass, plastic or other suitable material, are each slightly larger in size than plate 24 that covers the light aperture of reflector 22. Also, diffusion plates 58 and 59 are spaced from each other by a distance slightly greater than the height of plate 24. Diffusion plates 58 and 59 have different angles of diffusion that will depend on the specific photographic system requirements. For example, diffusion plate 58 may be designed to produce a wide-angle diffusion, while diffusion plate 59 is designed to produce an even wider angle of diffusion, i.e. a so-called "super-wide" angle.

Windings 51 and 52 are connected, through well known drive circuit 120, to microprocessor control circuit 110. Circuit 110 receives exposure information, e.g. the ambient light level, from exposure control system 61 and subject-distance information from rangefinding system 63. In response to the measured light level obtained from system 61 and subject-distance information obtained from system 63, microprocessor control circuit 110, through drive circuits 120, implements appropriate logic to activate the firing circuitry (not specifically shown) of the flash and energize either winding 51 or winding 52 or neither winding. The exposure control system includes a light-metering system, which, in a simple implementation, consists of a photoconductive CdS cell which is used to detect the ambient lighting level. This system produces a high level when the ambient light level falls below a predetermined threshold amount. Advanced light-metering systems that measure the ambient illumination in a plurality of areas within the field-of-view of an objective lens (not shown) mounted to camera body 23 may also be used, if desired. With such advanced systems, the lighting contrast in the scene may be measured and used as a basis for triggering flash illumination for use as fill-flash illumination for photographing daylight scenes or use as full-flash illumination for photographing night scenes. Rangefinding system 63 determines the camera-to-subject distance with an, for example, infrared triangulation device, such as 3-Zone Rangefinder Circuit number H2152 currently available from Hamamatsu Corporation of Japan. This rangefinding system can either be a "stand-alone" system or one contained within an autofocusing system that is used in the camera. For simplicity and since autofocusing has no relevance to the present invention, we will henceforth consider rangefinding system 63 as a "stand-alone" system. Microprocessor control circuit 110 may utilize any one of many well-known currently available microprocessors, such as model 6805 produced by the Motorola Corporation, in conjunction with associated circuits (such as illustratively input/output circuits and memories) or even a single chip microcontroller. Inasmuch as the detailed manner through which circuit 110 is implemented, as well as that for exposure control system 61 and rangefinding system 63, is either well known in the art or readily apparent to anyone skilled in the art, then, to simplify the following discussion, the specific implementation of circuit 110 and of systems 61 and 63 will not be described in any detail hereinafter. Furthermore, since the software embedded within and used to operate microprocessor control circuit 110 to activate the flash unit and vary its angle-of-illumination in accordance with our inventive teachings would be readily apparent to anyone skilled in the art, then, again for simplicity, the following discussion will also omit any details thereof.

Figure 3:
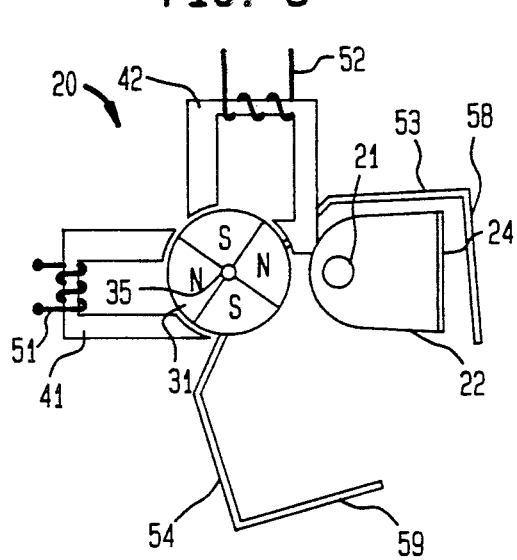
FIG. 3 is a view similar to FIG. 2 but showing the first embodiment in a second operating position.
Figure 4:
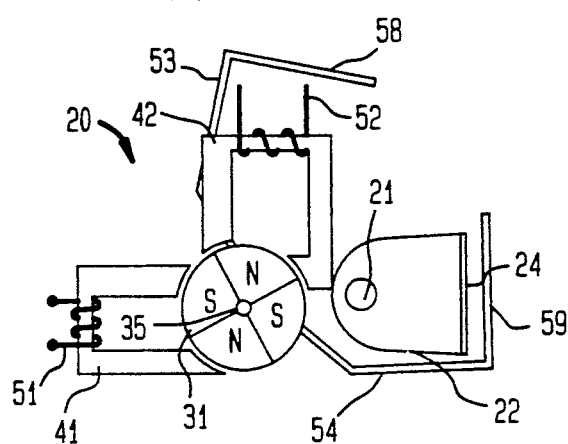
FIG. 4 is a view similar to FIG. 2 but showing the first embodiment in a third operating position.

In operation, four-pole magnet 31, cores 41 and 42, and windings 51 and 52 collectively form a simple three-position stepper motor that acts as the system actuator for pivoting diffusion plates 58 and 59 into one of the three discrete positions as illustrated in FIGS. 2–4. The neutral position, illustrated in FIG. 2, occurs when there is no power applied to either winding 51 or 52. In this instance, coil spring 36 holds magnet 31 and, therefore, diffusion plates 58 and 59 in the position shown. In the neutral position, light from flash tube 21 is transmitted through the open space between diffusion plates 58 and 59. As such, diffusion plates 58 and 59 will not interfere with this light. Accordingly, the full light output from reflector 22 will be available for telephoto and/or high-illumination photography.

When rangefinding system 63 detects that the subject is within a certain subject-distance range and that exposure control system 61 determines that the ambient lighting level is suitable for flash illumination, then microprocessor control circuit 110, through drive circuit 120, energizes either winding 51 or 52. For example, if the subject is within range for normal photography, winding 51 may be energized to pivot magnet 31 clockwise into the position shown in FIG. 3. Diffusion plate 58, which may produce a moderate wide-angle diffusion, will now cover the aperture of reflector 22.

Likewise, if the subject is detected by the rangefinding system 63 to be within the range for close-up photography, and flash illumination is appropriate as indicated by exposure control system 61, winding 52 will be energized to pivot magnet 31 counterclockwise into the position shown in FIG. 4. Here, diffusion plate 59 covers the aperture of reflector 22, thereby producing the maximum amount of wide-angle illumination.

Figure 5:
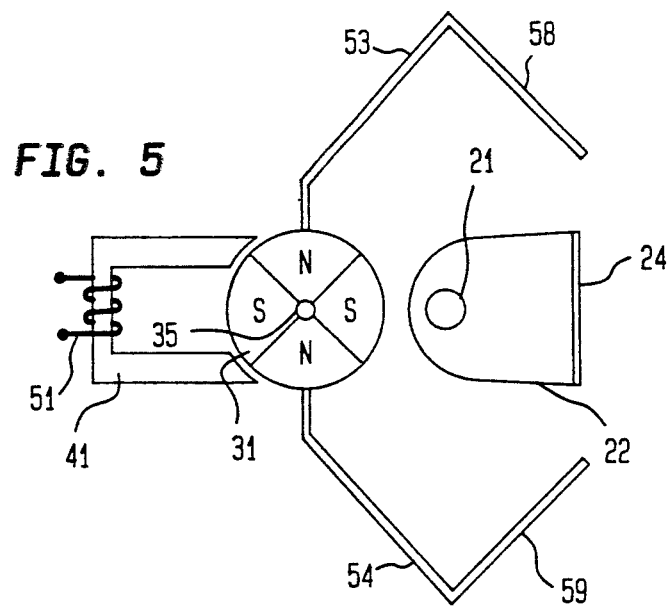
FIGS. 5-7 collectively depict a second embodiment of our invention similar to that shown in FIGS. 2-4 but with only one single armature and situated in the same respective positions as shown therein.
Figure 6:
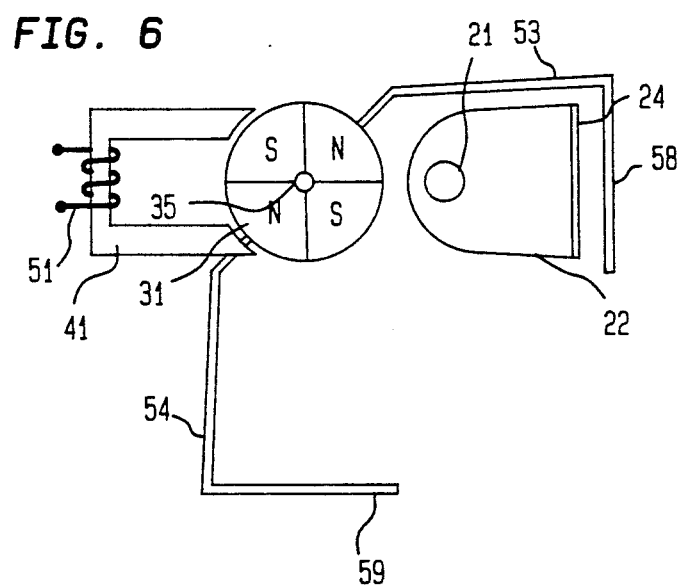
Figure 7:
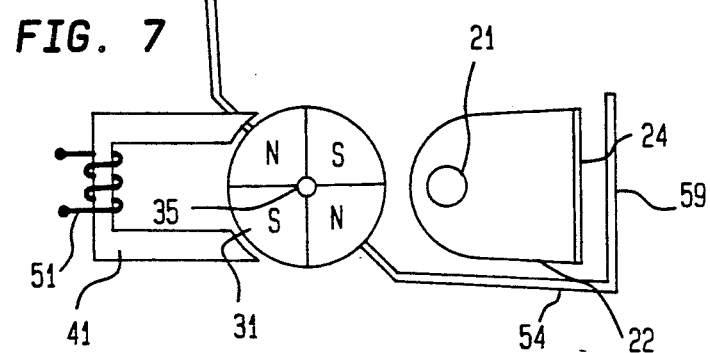

The embodiment shown in FIGS. 2–4 can also be constructed with a single armature as collectively depicted in FIGS. 5–7. Here, the embodiment is identical with that shown in FIGS. 2–4 with the exception being the omission of armature 42 and winding 52. In this case, winding 51 would be energized through drive circuit 120 by applying to it a drive current of appropriate level and polarity to rotate magnet 31 in a desired clockwise or counter-clockwise direction from its neutral position shown in FIG. 5.

Figure 8:
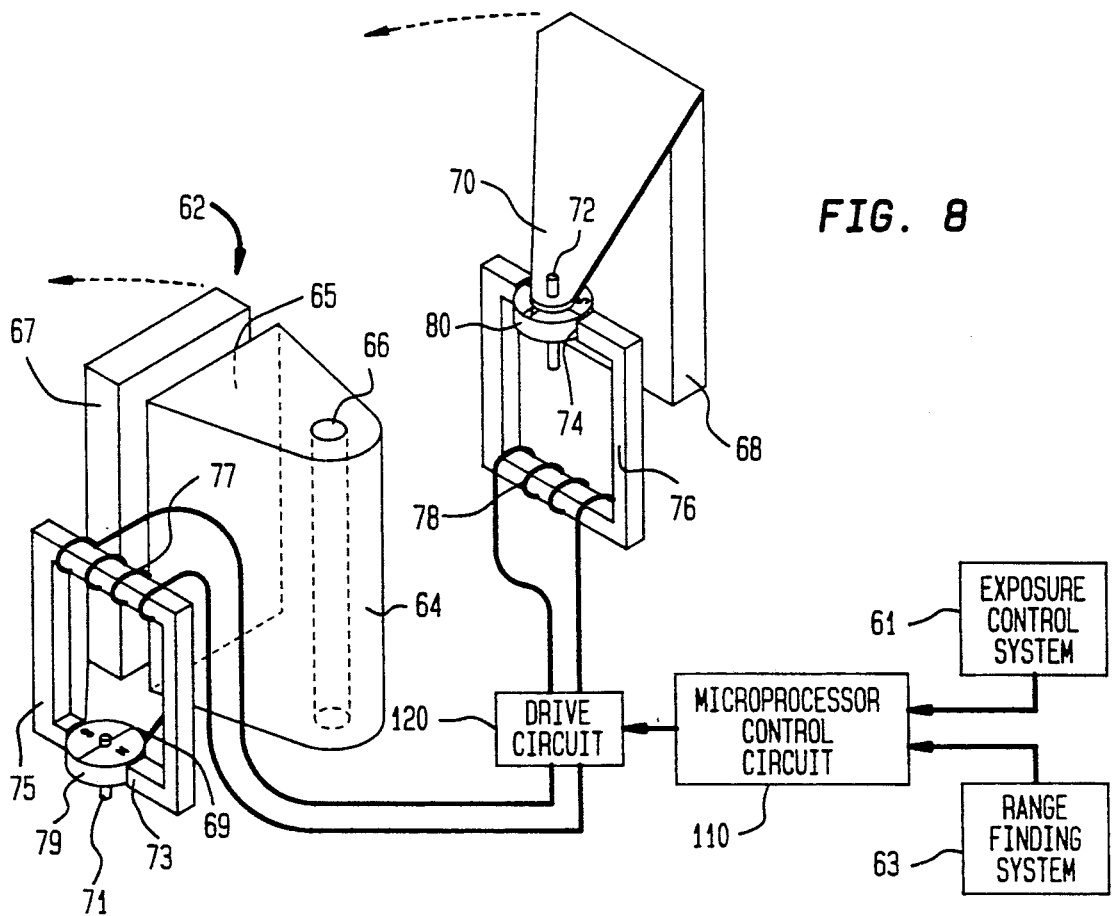
FIG. 8 is a pictorial view of a third embodiment of our invention.

FIG. 8 illustrates a third embodiment showing electronic flash system 62 that is constructed in accordance with the principles of our invention. System 62 includes reflector 64 having light output aperture 65. Reflector 64 houses flash tube 66. A pair of diffusion plates 67 and 68 are mounted on either side of reflector 64 through brackets 69 and 70, and shaft 71 and 72, respectively. A pair of magnets 79 and 80 are fixed on shafts 71 and 72, respectively. Magnets 79 and 80 are cylindrically shaped two-pole magnets. These magnets are situated between opposing pole faces 73 and 74 of C-shaped armatures 75 and 76, respectively. The resulting magnetic circuits are bi-stable, thereby eliminating a need to include coil springs to return the magnets to a starting position. Normally, brackets 69 and 70 are positioned such that diffusion plates 67 and 68 are pivoted to opposite sides of reflector 64. Armatures 75 and 76 have respective windings 77 and 78.

Reflector 64 and armatures 75 and 76 are fixed to the camera body (not shown). Shafts 71 and 72 are also mounted for rotation on the camera body. Diffusion plates 67 and 68 may each be pivoted individually from the normal position at the sides of light output aperture 65, as illustrated by the position of plate 68, to an engaged position in front of aperture 65, as illustrated by the position of plate 67 by energizing winding 77 or 78 with a drive current of appropriate polarity. Windings 77 and 78 are connected to the outputs of drive circuit 120 in the same manner as shown in the embodiment depicted in FIGS. 1–4.

Operation of the embodiment shown in FIG. 5 is similar to that of the embodiment depicted in FIGS. 1—4. Diffusion plates 67 and 68, like plates 58 and 59, possess different degrees of diffusion. Depending on the distance of the subjected as detected by rangefinding system 63 and the ambient light level as detected by exposure control system 61, microprocessor control circuit 110 energizes, through drive circuits 120 and a drive current of suitable amplitude and polarity, winding 77 and/or 78. When winding 77 is appropriately energized, it causes magnet 73 to rotate which, in turn, pivots diffusion plate 67 to a position in front of aperture 65. In this position, the light output from reflector 64 will be diffused a predetermined amount to accommodate close-up photography. When winding 78 is appropriately energized, it causes a similar operation to occur by moving diffusion plate 68 in front of aperture 65. In the event that the subject is located at a excessive distance from the camera or a proper exposure would not permit reduced illumination, then both windings will be oppositely energized. As such, diffusion plates 67 and 68 are both rotated to their normal positions at opposite sides of reflector 64, and the light output from reflector 64 remains at a maximum value.

Figure 9:
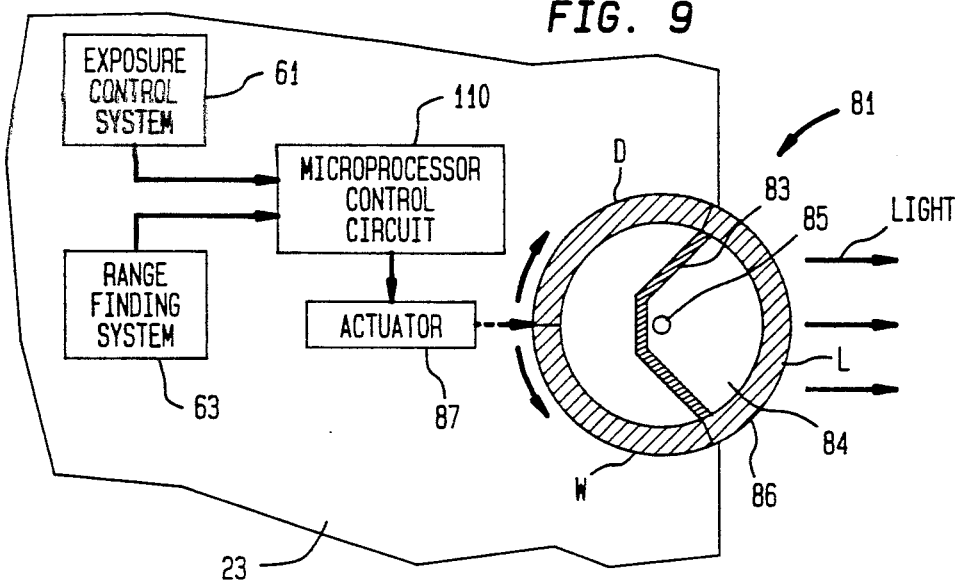
FIG. 9 is a sectionalized side view of a fourth embodiment of our invention.

FIG. 9 illustrates a fourth embodiment of our present invention. Here, electronic flash 81 includes reflector 83 having aperture 84 and flash tube 85. The reflector 83 is fixed on camera body 23. Circular cylindrical flash lens-diffuser 86, made of plastic or glass, surrounds reflector 83. Lens-diffuser 86 is composed of three 120 degree sections W, D, L. Each section is designed to provide a different distribution, i.e. angle of coverage, of light. Section W is a clear window which provides a normal light spread, as defined by the shape of the reflector 83. In section D, the surface of lens-diffuser 86 is designed to spread the light and create a diffuse, wide-angle coverage. The surface of lens-diffuser 86 in section L acts as a lens, providing a narrow angle or telephoto-type flash coverage.

Actuator 87 mounts lens-diffuser 86 for rotation about its longitudinal axis which is coincident with the axis of flash tube 85. Actuator 87, which is energized by the output of the drive circuits 120 in the manner described above with respect to the embodiments of FIGS. 1-5, rotates lens-diffuser 86 into one of three discrete positions. Section W, when located in front of aperture 84, provides normal coverage for medium distances. Section D provides wide-angle coverage for short distances. Section L provides narrow-angle coverage for long distances.

Figure 10:
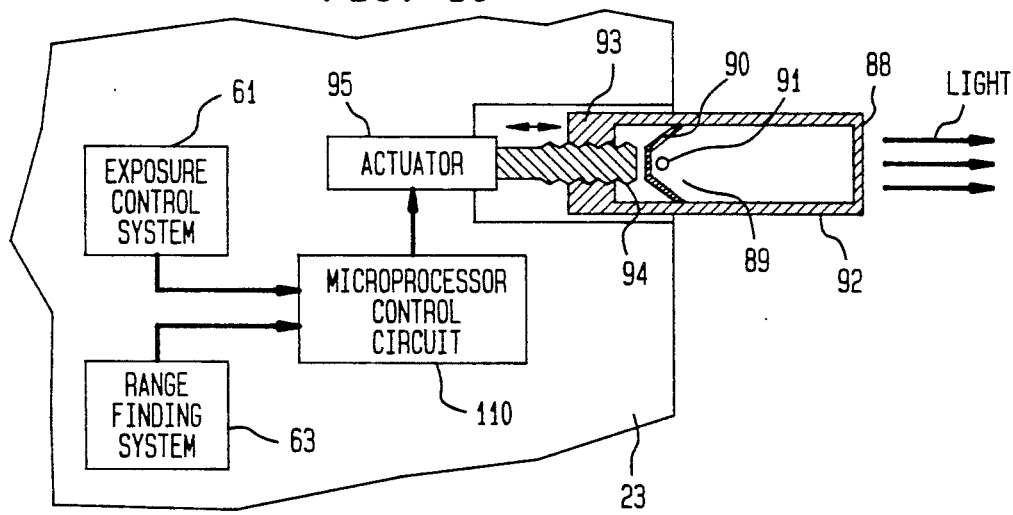
FIG. 10 is a sectionalized side view of fifth embodiment of our invention.

The fifth embodiment of FIG. 10 includes a moveable lens-diffuser plate 88 that is slidably mounted for linear movement toward or away from aperture 89 of flash reflector 90. This reflector is fixed to camera body 23 and houses flash tube 91. Lens-diffuser plate 88 is supported at one end of hollow body 92 that slidably extends over reflector 90. The other end of body 92 has rear wall 93 with a threaded opening therein. Actuator screw 94 extends through the threaded opening in wall 93. Actuator 95, controlled by drive circuits 120, rotates screw 94 to linearly slide lens-diffuser 88 to different positions in front of aperture 89 in order to vary the illumination coverage. In response to detected changes in camera-to-subject distance, microprocessor control circuit 110, through drive circuits 120, slides lens-diffuser 88 towards flash tube 91 for close-up exposures or away from flash tube 91 for telephoto exposures. Of course, whether flash illumination is used or not is governed by the ambient lighting level detected through exposure control system 61 as described above.

Figure 11:
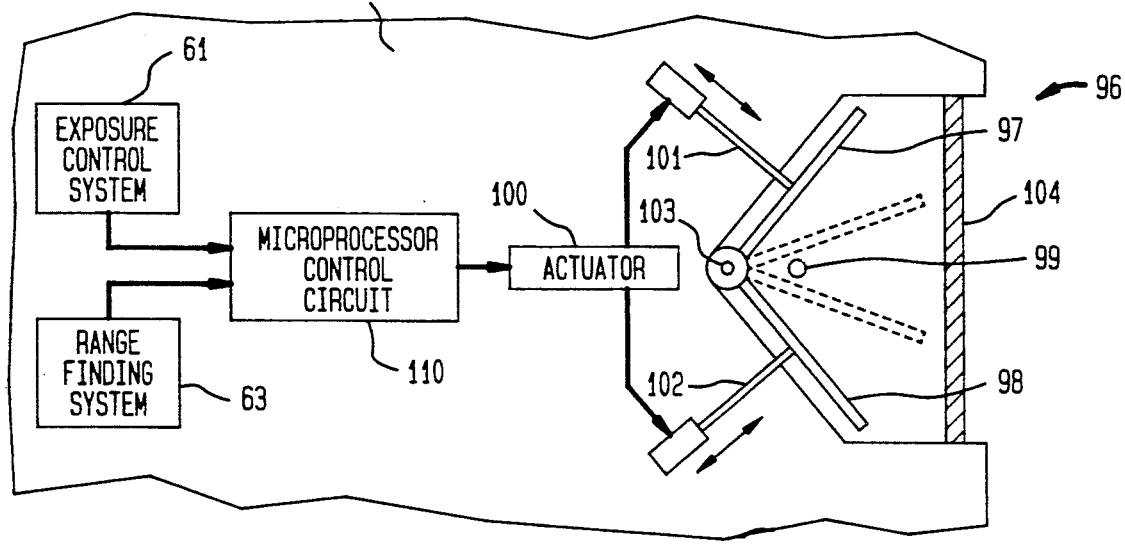
FIG. 11 is a side view of a sixth embodiment of our invention.

The sixth embodiment illustrated in FIG. 11 alters the flash angle-of-illumination by changing the shape of a reflector. Electronic flash system 96 of FIG. 8 includes a reflector having two reflective surfaces 97 and 98 that are hinged at point 103 on camera body 23 and pivot with respect to each other behind clear protective plate 104. Flash tube 99 is mounted between the reflective surfaces 97 and 98 and adjacent to pivot 103. Actuator 100 controls plungers 101 and 102 in response to the output of drive circuits 120. Plungers 101 and 102 are connected to the rear of the respective reflective surfaces 97 and 98 for pivoting these surfaces to vary the shape of the reflector and, therefor, its angle of coverage. When the angle between reflective surfaces 97 and 98 is small, the angle-of-illumination provided by the flash is relatively narrow thereby providing flash illumination for telephoto exposures. Alternatively, when the angle between reflective surfaces 97 and 98 is wide, then the flash angle-of-illumination is relatively wide thereby providing substantially uniform, diffuse flash illumination for close-up exposures. Alternatively, mechanically actuated reflective surfaces 97 and 98 could be advantageously replaced by piezo-electrically moveable surfaces. In particular, the reflective surfaces would be backed by a laminate of piezo-electric material that flexes in response to a change in potential applied across the laminate. This flexing can be used to controllably change the angle-of-illumination that is to be provided by the flash unit. Such a piezo-electrically actuable flash unit is shown in U.S. Pat. No. 4,821,053 (issued to D. Dowe et al on Apr. 11, 1989 and owned by the present assignee hereof).

Although various embodiments of the present invention have been shown and described in detail herein, many other varied embodiments that incorporate the teachings of our present invention may be easily constructed by those skilled in the art. Hence, it is therefore to be understood, that within the scope of the appended claims, the invention may be practiced in a myriad number of ways other than as specifically described herein.

INDUSTRIAL APPLICABILITY AND ADVANTAGES

The present invention is useful for varying the spread of flash illumination based on camera-to-subject distance and will find particular utility in inexpensive fixed-focus, fixed-aperture photographic cameras that do not possess secondary exposure control systems or associated mechanisms. Use of the invention advantageously provides more uniform flash illumination, particularly for principal subjects that are to photographed at relatively close camera-to-subject distances, than that previously obtainable in such inexpensive cameras known in the art.

We claim:

1. A camera having a dedicated flash system comprising:
    a camera body;
    a flash tube;
    light-directing means mounted on said camera body adjacent said tube for directing a light beam from said tube toward a subject to be photographed, said light beam having an illumination angle;
    distance-ranging means for detecting the distance between said camera body and said subject; and
    actuator means controlled by said distance-ranging means and connected to said light-directing means for adjusting the width of said illumination angle as a function of the detected distance between said camera body and said subject.

2. The camera of claim 1 further comprising means for measuring an ambient light level of the subject to be photographed, and wherein said actuator means comprises means, responsive to said ambient light level measuring means, for triggering said flash tube to produce flash illumination only if the measured ambient light level is below a pre-defined amount.

3. The camera of claim 1 wherein said light-directing means comprises a light reflector having a light-output aperture and a plurality of light-transmitting members mounted for selective movement over said aperture by said actuator means, and each said light-transmitting member transmitting light at a different illumination angle.

4. The camera of claim 3 wherein said light-transmitting members comprise at least two spaced plates.

5. The camera of claim 4 wherein at least one of said plates is a wide-angle light diffuser.

6. The camera of claim 3 wherein said light-transmitting members are joined to each other to move as a unit.

7. The camera of claim 6 wherein said light-transmitting members form a hollow cylinder that covers said light reflector.

8. The camera of claim 7 wherein said light-transmitting member has a plurality of sections each of which has means for transmitting said light beam at a different illumination angle.

9. The camera of claim 7 wherein said light-transmitting member has at least first, second and third sections, said first section having means for focusing said beam into a narrower illumination angle, and said second section having means for spreading said beam into a wider illumination angle.

10. The camera of claim 9 wherein said first section is a lens, said second section is a diffuser, and said third section is clear.

11. The camera of claim 1 wherein said light-directing means comprises a light reflector having a light-output aperture and a light-transmitting member mounted for selective movement by said actuator means into different positions spaced from said flash tube.

12. The camera of claim 11 wherein said light-transmitting member comprises a light diffuser.

13. The camera of claim 11 wherein said actuator means comprises a screw and a threaded plate connected to said light-transmitting member whereby said actuator means causes linear movement of said light-transmitting member upon actuation of said screw.

14. The camera of claim 1 wherein said light-directing means comprises:
a light reflector with an output aperture and reflective surfaces, and
means for changing the shape of the reflective surfaces.

15. The camera of claim 14 wherein said reflective surfaces comprise at least two moveable plates hinged to each other and said actuator means adjusts the width of said illumination angle by pivoting said plates into different positions.

16. The camera of claim 15 wherein said actuator means comprises moveable plungers abutting said reflector for moving said surfaces.

17. The camera of claim 1 wherein said actuator means comprises a stepper motor having a plurality of discrete stable positions.

18. The camera of claim 17 wherein said stepper motor comprises a magnetic rotor coupled to at least two armatures, each said armature positioned to move said rotor into a different one of said stable positions.

19. The camera of claim 18 wherein said magnetic rotor is a four-pole magnet.

20. The camera of claim 18 wherein said light-directing means comprises first and second light-transmitting members mounted on said rotor and spaced from each other, said members having means for transmitting said light beam along a common axis with respect to said camera body and at different illumination angles.

21. The camera of claim 1 wherein said actuator means comprises first and second motors, and said light-directing means comprises two light-transmitting members each joined to one of said motors and said members having means for transmitting said light beam along a common axis with respect to said camera body and at different illumination angles.

* * * * *